United States Patent [19]

Harden

[11] Patent Number: 5,687,621
[45] Date of Patent: Nov. 18, 1997

[54] DIFFERENTIAL GEAR DRIVE MECHANISM

[76] Inventor: James R. Harden, 520 Redwood Ave., Ben Lomond, Calif. 95005

[21] Appl. No.: 665,486

[22] Filed: Jun. 18, 1996

[51] Int. Cl.$^6$ ................................................. F16H 48/16
[52] U.S. Cl. ............................................................ 74/650
[58] Field of Search ............................................... 74/650

[56] References Cited

U.S. PATENT DOCUMENTS

| | | | |
|---|---|---|---|
| Re. 29,872 | 1/1979 | Goscenski | 74/711 |
| 1,224,124 | 5/1917 | Adler | 74/650 |
| 1,229,883 | 6/1917 | Carlisle | 74/650 |
| 1,371,361 | 3/1921 | Gaston | 74/650 |
| 1,406,211 | 2/1922 | Myers | 74/650 |
| 1,434,778 | 11/1922 | Harris | 74/650 |
| 1,437,453 | 12/1922 | Sheckler | 74/650 |
| 1,452,316 | 4/1923 | Shirley | 74/650 |
| 1,590,129 | 6/1926 | Stratford | 74/650 |
| 1,632,787 | 6/1927 | Crawford . | |
| 1,839,195 | 1/1932 | Bowen | 74/650 |
| 2,569,533 | 10/1951 | Morgan | 74/711 |
| 2,697,366 | 12/1954 | Carter | 74/711 |
| 3,818,781 | 6/1974 | Goscenski | 74/711 |

*Primary Examiner*—Dirk Wright
*Attorney, Agent, or Firm*—Bruce & McCoy

[57] ABSTRACT

A differential gear drive mechanism comprised of an outer drive gear and a pair of driven gears secured to the output shafts with the driven gears powered by spring biased pawls mounted on the drive gear which alternately engage the driven gears depending upon the direction of rotation of the drive gear.

5 Claims, 2 Drawing Sheets

DIFFERENTIAL GEAR DRIVE MECHANISM

BACKGROUND OF THE INVENTION

1. Field of the Invention

The present invention relates to differential gear drive mechanisms and, more particularly, to an automotive front or rear axle differential gear mechanism for automotive vehicles.

2. Description of the Prior Art

Automotive rear end differential gear mechanisms have been in use since the early 1900s, and numerous designs and improvements have been adapted and used in the automobile, truck, farm tractor, recreational, military, and all terrain vehicle industries.

The present invention provides a new and novel differential gear mechanism of simplified design and improved performance for special use automotive vehicles.

SUMMARY OF THE INVENTION

The present invention is a differential gear mechanism which is comprised of a drive gear mounted for free rotation on a first output shaft. The drive gear includes an outer ring gear element which is mounted coaxial to and captured by, and adjustably interlocked with, an inner ring portion which is rotatably mounted on the output shaft. The adjustable interlock permits relative rotation between the inner and outer ring members for a few degrees of limited rotation in either direction around the output shaft. A first driven spur gear is mounted coaxial to the drive gear on the output shaft and is engaged therewith. A multiplicity of first drive pawls are pivotally secured to the drive gear inner ring portion and are spring biased to alternately engage the driven spur gear teeth in coordinated action. The pawls rotate the driven gear in the same direction as the drive gear unless a counter torque is imposed on the output shaft and overcomes the spring bias to reverse the engagement of the pawls and permit the drive gear to impose a counter-torque on the output shaft. A mirror image second driven spur gear can be disposed on the opposite side of the drive gear and mounted on and engaged with a second output shaft mounted coaxial to the first output shaft. A second set of drive pawls identical to the first set is then mounted on the opposite side of the drive gear and formed to engage the second driven gear in the same manner as the first set of drive pawls engages the first driven gear.

OBJECTS OF THE INVENTION

It is therefore an important object of the present invention to provide an improved differential gear drive mechanism.

It is another object of the present invention to provide a smooth acting, quick reversing, differential gear drive mechanism of simplified design.

It is yet a further object of the present invention to provide an improved differential gear drive mechanism for automotive vehicle utilization.

And it is still a further object of the present invention to provide an improved differential gear drive for ATVs which is terrain friendly and does less damage to the ground and environment than other differentials currently in use.

Other objects and advantages of the present invention will become apparent when the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
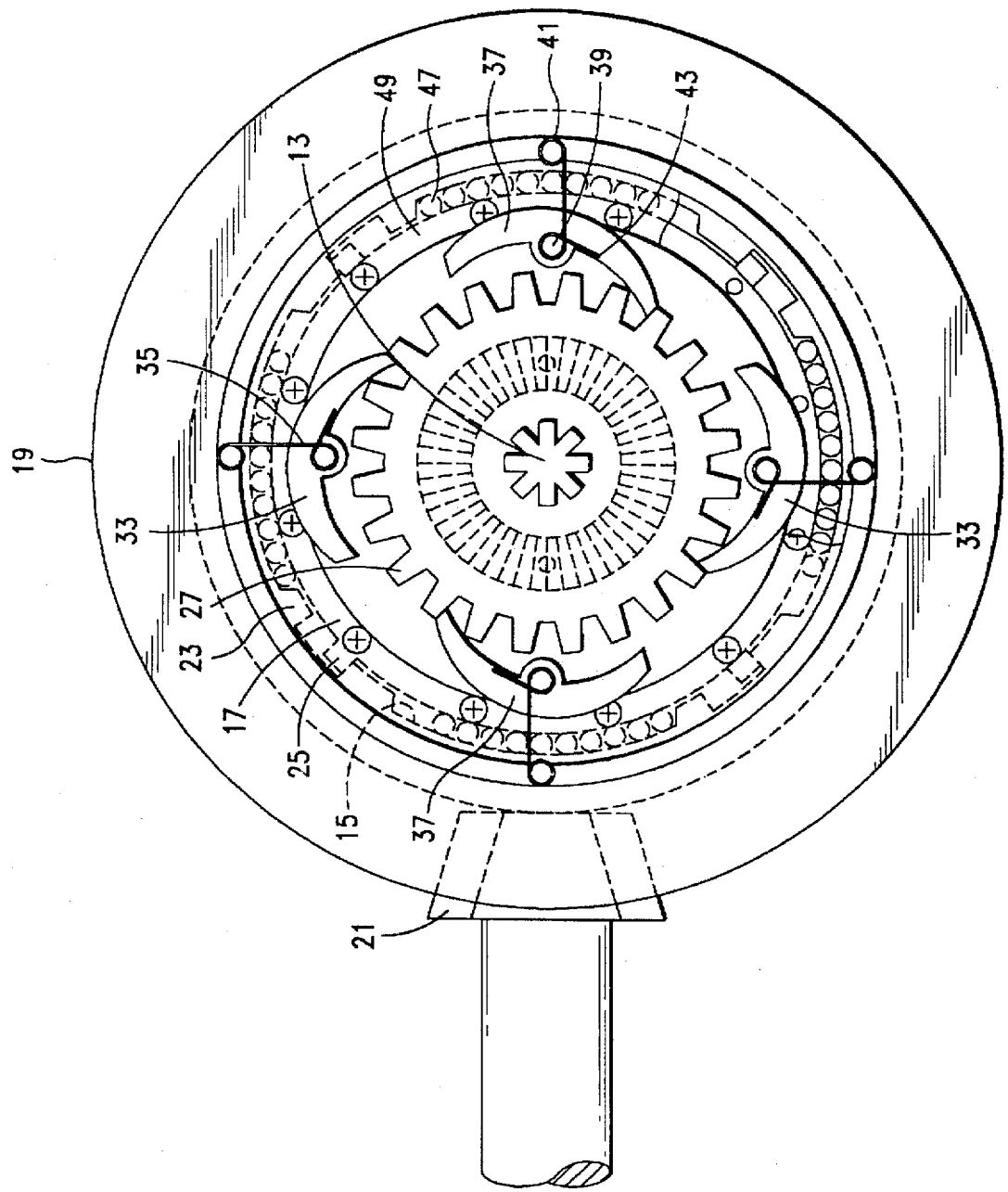
FIG. 1 is an end elevation partially broken out to show the inner mechanism of the improved differential gear mechanism of the present invention.
Figure 2:
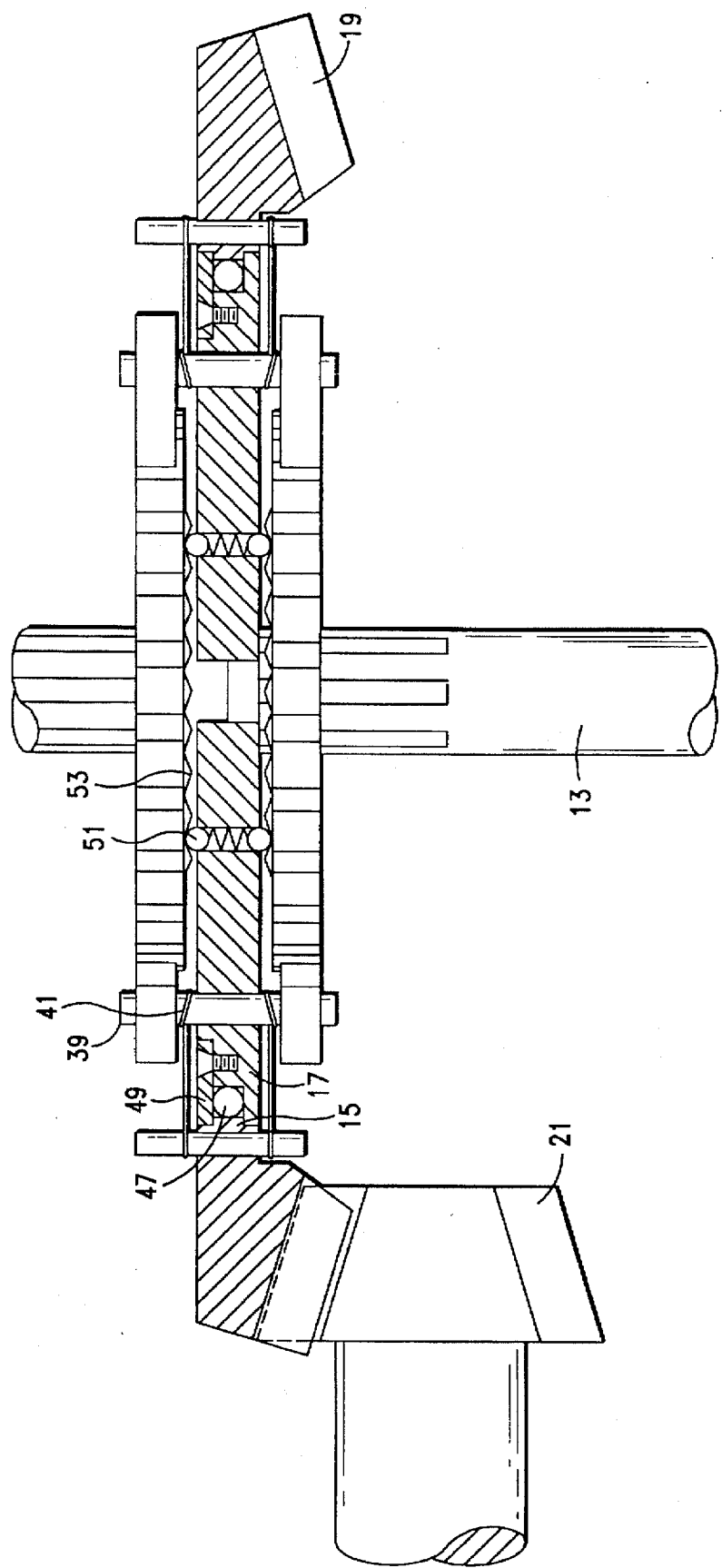
FIG. 2 is a top plan cross-section view thereof.

The differential gear drive mechanism of the present invention is especially adapted for use in automotive vehicle type assemblies for either front or rear axle drive. Reference is made to FIGS. 1 and 2 of the drawings which illustrate in broken out side elevation and end view cross section the elements of the mechanism.

Thereshown is a drive gear 11 mounted for free rotation on a first output shaft 13. The drive gear includes an outer ring gear element 15 which is mounted coaxial to and captured by, and adjustably interlocked with, an inner ring portion 17 which is rotatably mounted on the first output shaft. The outer ring gear element includes a gear face 19 similar to the differential ring gear in an automotive differential winch is driven by an angulated spur gear or pinion gear 21 on a drive shaft. The outer ring member can be an element of any other drive means such as a chain sprocket, a belt pulley, a friction wheel or the like.

A means winch effects an adjustable interlock permits relative rotation between the inner and outer ring members 17, 15 of the drive gear 11 for a few degrees of limited relative rotation in either direction around the output shaft. The adjustable interlock between the inner and outer ring members is comprised of a multiplicity of inward projecting stops 23 formed on the outer ring element 15 of the drive gear and a multiplicity of radially outward projecting stops 25 formed on the inner ring portion 17 of the drive gear. The projecting stops from one of the ring members are captured between pairs of stops projecting from the other ring member permitting limited relative rotational motion of one ring member with respect to the other based on the distance the captured stops of the one ring member can move between the pairs of stops projecting from the other ring member.

A first driven spur gear 27 is mounted coaxial to the drive gear 11 on the first output shaft 13 and is engaged therewith. In the preferred embodiment, the spur gear is mounted on the output shaft with a typical spline connection. A mirror image second driven spur gear 29 is disposed on the opposite side of the drive gear and mounted on a second output shaft 31 winch is mounted coaxial to the first output shaft. The mechanism can operate as a single output shaft differential gear mechanism without the second gear and associated duplicate elements.

A multiplicity of first drive pawls 33 are pivotally secured to the drive gear inner ring portion 17 and are spring biased 35 to alternately engage the driven spur gear teeth in a coordinated action to rotate the driven gear 27 in the same direction as the drive gear 11. However, if a counter torque is imposed on the output shaft 13, that torque overcomes the spring bias to reverse the engagement of the pawls and permit the drive ring gear to impose a counter-torque on the output shaft. A second set of drive pawls 37 identical to the first set is mounted on the opposite side of the drive gear and formed to engage the second driven gear 29 in the same manner as the first set of drive pawls engages the first driven gear.

The pawls 33, 37 are rocker shaped and are pivoted at the centers thereof whereby the opposite ends of the pawls alternately engage the teeth of the driven spur gears 27, 29 depending upon which direction of rotationl torque is imposed on the drive gear 11. The pawls are biased by a spring mechanism 35 which individually interconnects each pawl to the outer ring element 15 whereby the rocker pawl alternately engages the driven gear depending on the direction of the torque applied to the outer ring element.

The spring bias 35 is quite simple in design and includes springs secured to the drive gear. In a preferred embodiment, bent wire springs are coiled around pivot posts 39 formed on the drive gear inner ring portion 17. The same posts are also the pivot posts for the pawls 33, 37. One end 41 of the spring is coiled around a post projecting from the outer ring portion 19 of the drive gear 11. The other end 43 of the spring is pinned into the pawl by bending the end of the spring at right angles and inserting it into a hole formed in the surface of the pawl.

The projecting stops 23, 25 formed on the inner and outer drive ring members 15, 17 also form a multiplicity of partial circumferential cavities 45 between the ring members. The cavities are formed for containing a multiplicity of ball bearings, 47 of which are disposed in the cavities but do not fill them. The ball bearings support the inner and outer drive ring members in spaced rotatable relation with respect to each other. A flat ring 49 bolts to the inner drive ring to contain the ball bearings in the cavities.

The inner ring portion 17 of the drive gear 11 also includes spring biased ball bearings 51 biased toward the adjacent surface of the proximate driven gear 27, 29. The adjacent surfaces of the spur gears include a washboard surface 53 for engaging the ball bearings. When the pawls 33, 37 are centered, and not engaging the driven spur gears, it is possible the mechanism could freewheel. The spring loaded ball bearings prevent freewheeling by causing the spur gears to rotate thereby forcing the pawls into engagement.

In operation, the outer differential ring gear element 15 is driven by the pinion gear 21 mounted on the drive shaft converting the rotational drive shaft energy into circular motion around the output shaft 13. The radially inward projecting stops 23 on the outer ring gear element are aligned with and rotate to engage the radially outward projecting stops 25 on the inner ring portion 17. The inner and outer ring gear elements translate rotationally with respect to each other on the ball bearings 49 captured between the stops. As the inner and outer ring gear elements translate rotationally with respect to each other, the spring bias of the points 33, 37 cause them to rock one way or the other depending upon the direction of rotation of the outer ring gear element until they engage the driven spur gear 27 to cause it to rotate, and being splined to the output shaft, to cause the output shaft to rotate in the same direction as the differential ring gear.

When the rotational torque of the drive shaft is reduced sufficiently to cause a reverse torque on the rotational momentum imposed on the differential ring gear, the inner and outer elements of the ring gear reverse translate and cause the spring bias to reverse the pawls. This causes the reverse torque from the drive shaft transmitted through the differential ring gear to in turn be translated to the drive shaft as a reverse torque-braking force on the rotational momentum of the system.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. A differential gear drive mechanism comprising a drive gear mounted for free rotation on an output shaft, said drive gear including an outer ring gear element mounted coaxial to, and captured by, and adjustably interlocked with, an inner ring portion which is rotatably mounted on said output shaft, said adjustable interlock permitting relative rotation between said inner and outer ring members for a few degrees of limited rotation in either direction around said output shaft, a first driven spur gear mounted coaxial to said drive gear on said output shaft and engaged therewith, a multiplicity of first drive pawls pivotally secured to said drive gear inner ring portion and spring biased to alternately engage said driven spur gear teeth in coordinated action to rotate said driven gear in the same direction as said drive gear unless a counter torque imposed on said output shaft overcomes said spring bias to reverse the engagement of said pawls and to permit said drive gear to impose a counter torque on said output shaft.

2. The differential gear drive mechanism of claim 1 including a mirror image second driven spur gear disposed on the opposite side of said drive gear and mounted on and engaged with a second output shaft mounted coaxial to said first output shaft, and a second set of drive pawls identical to said first set mounted on the opposite side of said drive gear and formed to engage said second driven gear in the same manner as said first set of drive pawls engages said first driven gear.

3. The differential gear drive mechanism of claim 1 wherein the means effecting said adjustable interlock comprises a multiplicity of radially inward projecting stops formed on said outer ring element of said drive gear, and a multiplicity of radially outward projecting stops formed on said inner ring portion of said drive gear, the projecting stops from one of the ring members being captured between pairs of stops from the other ring member permitting limited relative rotational motion of one ring member with respect to the other based on the distance the captured stop of the one ring member can move between the stops of the other ring member, a multiplicity of partial circumferential cavities formed by said stops between said ring members, and a multiplicity of ball bearings disposed in said cavities but not filling them.

4. The differential gear drive mechanism of claim 1 wherein said pawls are rocker shaped and pivoted at the centers thereof whereby the opposite ends thereof alternately engage the teeth of the driven spur gear depending on which direction of rotation the drive gear turns, said pawls being biased by a spring mechanism which individually interconnects each pawl to said outer ring element whereby said rocker pawl alternately engages said driven gear depending upon which direction the outer ring element of said drive gear is rotating.

5. A differential gear drive mechanism comprising a drive gear mounted for free rotation on an output shaft, said drive gear including an outer ring gear element mounted coaxial to, and captured by, and adjustably interlocked with, an inner ring portion which is rotatably mounted on said output shaft, said adjustable interlock permitting relative rotation between said inner and outer ring members for a few degrees of limited rotation in either direction around said output shaft, a first driven spur gear mounted coaxial to said drive gear on said output shaft and engaged therewith, a mirror image second driven spur gear disposed on the opposite side of said drive gear and mounted on and engaged with a second output shaft mounted coaxial to said first output shaft, a multiplicity of first drive pawls pivotally secured to said drive gear inner ring portion and spring biased to alternately engage said driven spur gear teeth in coordinated action to rotate said driven gear in the same direction as said drive gear unless a counter torque imposed on said output shaft overcomes said spring bias to reverse the engagement of said pawls and to permit said drive gear to impose a counter-torque on said output shaft, said pawls being rocker shaped and pivoted at the centers thereof whereby the opposite ends thereof alternately engage the teeth of the driven spur gear depending on which direction of rotational torque is imposed on the drive gear, said pawls being biased by a spring mechanism which individually interconnects each pawl to said outer ring element whereby said rocker pawl alternately engages said driven gear depending upon the direction of torque applied to said outer ring element, a second set of drive pawls identical to said first set mounted on the opposite side of said drive gear and formed to engage said second driven gear in the same manner as said first set of drive pawls engages said first driven gear, a multiplicity of radially inward projecting stops formed on said outer ring element of said drive gear, a multiplicity of radially outward projecting stops formed on said inner ring portion of said drive gear, the projecting stops from one of the ring members being captured between pairs of stops from the other ring member permitting limited relative rotational motion of one ring member with respect to the other based on the distance the captured stop of the one ring member can move between the stops of the other ring member, a multiplicity of partial circumferential cavities formed between said ring members by said stops, a multiplicity of ball bearings disposed in said cavities but not filling them, and said inner ring portion of said drive gear including spring biased ball bearings biased outward from said drive gear towards the adjacent surfaces of said driven spur gears, said adjacent surfaces including a washboard surface for engaging said ball bearings.

\* \* \* \* \*